(12) United States Patent
Phillips

(10) Patent No.: US 10,677,191 B2
(45) Date of Patent: Jun. 9, 2020

(54) ADJUSTABLE REGISTER BELL HOUSING

(71) Applicant: HGT Precision Co., Ltd., Bangkok (TH)

(72) Inventor: John Phillips, Bangkok (TH)

(73) Assignee: HGT Precision Co., Ltd., Bangkok (TH)

(*) Notice: Subject to any disclaimer, the term of this patent is extended or adjusted under 35 U.S.C. 154(b) by 0 days.

(21) Appl. No.: 16/292,912

(22) Filed: Mar. 5, 2019

(65) Prior Publication Data

US 2019/0277223 A1    Sep. 12, 2019

(30) Foreign Application Priority Data

Mar. 6, 2018  (NZ) ...................................... 740507

(51) Int. Cl.
  *F02F 7/00*   (2006.01)
  *F16H 57/025* (2012.01)
  *F16H 57/02*  (2012.01)

(52) U.S. Cl.
  CPC ......... *F02F 7/0073* (2013.01); *F16H 57/025* (2013.01); *F16H 2057/0203* (2013.01)

(58) Field of Classification Search
  CPC ... F16H 2057/0203; F16H 2057/02082; F16H 2057/0222; F16H 57/025; F02F 7/0073
  See application file for complete search history.

(56) References Cited

U.S. PATENT DOCUMENTS

| | | |
|---|---|---|
| 3,696,689 A | 10/1972 | Senter et al. |
| 3,841,290 A | 10/1974 | Schubeck |
| 4,478,593 A | 10/1984 | Brown |
| 4,645,172 A | 2/1987 | Wilson |
| 5,267,488 A | 12/1993 | Hardeman et al. |
| 5,299,880 A * | 4/1994 | Bouchard ............. F02F 7/0073 403/3 |

(Continued)

FOREIGN PATENT DOCUMENTS

CN    206124755 U    4/2017

OTHER PUBLICATIONS 1965 to 1970 Mustang T5 Conversion Kits Explained, Sacramento Mustang, Specification Sheet, 5 Pages.

(Continued)

*Primary Examiner* — Vicky A Johnson
(74) *Attorney, Agent, or Firm* — McCarter & English, LLP

(57) ABSTRACT

Exemplary embodiments are directed to a bell housing with an adjustable register plate for providing adjustable engine crankshaft-transmission alignment. The bell housing includes a body adapted for attachment to an engine block. The adjustable register plate includes a register bore for accommodating the transmission. The register plate can be secured to the bell housing by inserting register plate fasteners through register plate fastener holes into the corresponding register plate attachment holes of the bell housing. The alignment of the register plate relative to the bell housing, and thereby alignment of the transmission with the crankshaft, can be adjusted by loosening the fasteners and moving the register plate laterally, about the register plate fasteners, relative to the bell housing, and then tightening the fasteners to locate the register plate in the desired position.

9 Claims, 4 Drawing Sheets

(56) References Cited

U.S. PATENT DOCUMENTS

| | | | | |
|---|---|---|---|---|
| 5,404,772 | A | * | 4/1995 | Jester .................... F16H 57/022 |
| | | | | 74/467 |
| 5,524,508 | A | | 6/1996 | Peters |
| 7,194,932 | B1 | * | 3/2007 | Costello ............... B60K 17/344 |
| | | | | 74/606 R |
| 9,360,100 | B2 | | 6/2016 | McCombs et al. |
| 2008/0210050 | A1 | | 9/2008 | Prettyman |
| 2016/0305533 | A1 | * | 10/2016 | Collins ................. F16H 57/025 |
| 2019/0277223 | A1 | * | 9/2019 | Phillips ................ F16H 57/025 |

OTHER PUBLICATIONS

Chevy V8 to Jeep T15 Transmission Adapter Kit, Specification Sheet, 2 Pages.
Adapting the Chevrolet & GM Standard Shift Bellhousings to the Jeep T150 Transmission, Specification Sheet, 8 Pages.

* cited by examiner

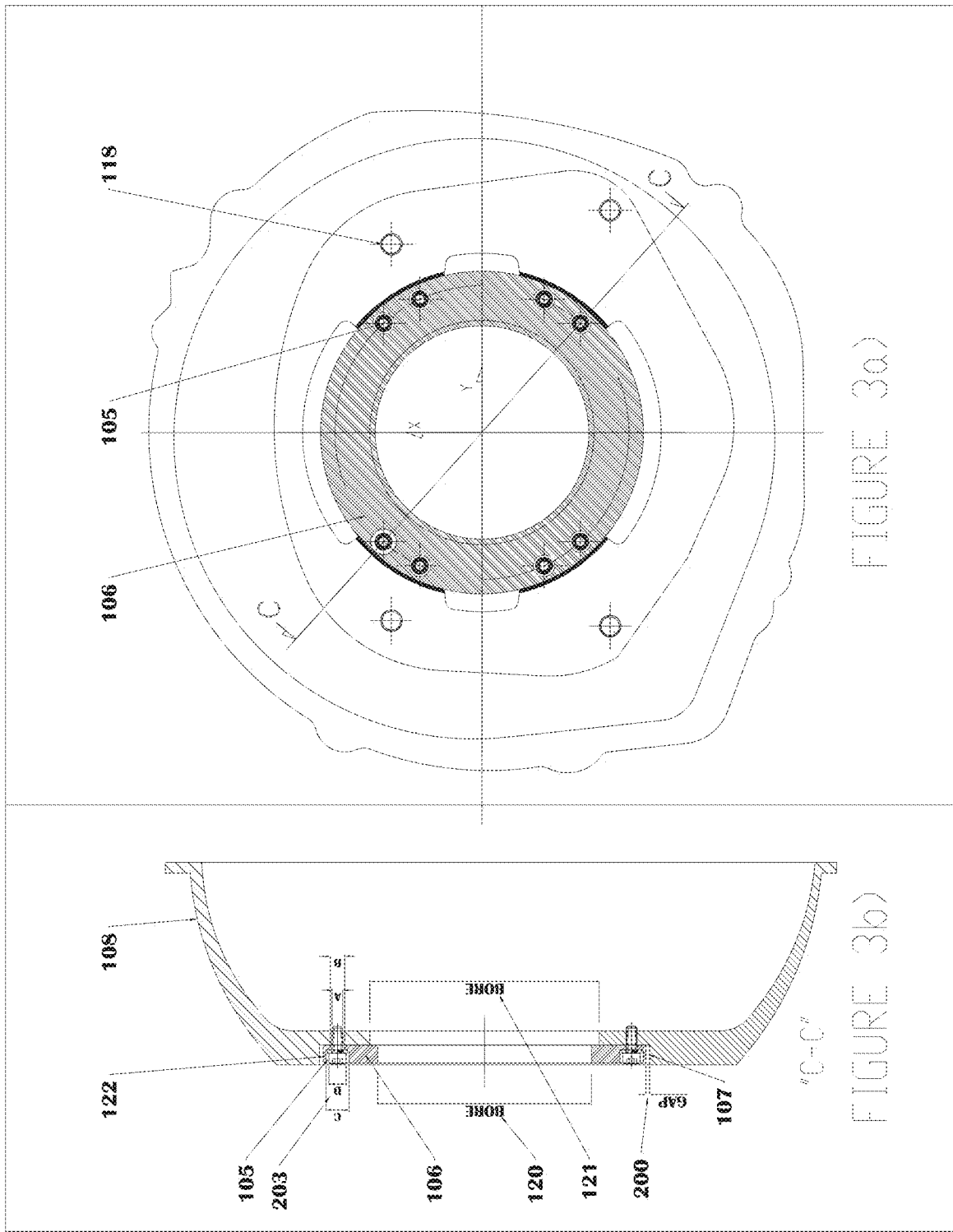

ADJUSTABLE REGISTER BELL HOUSING

CROSS-REFERENCE TO RELATED APPLICATIONS

The present application claims the priority benefit of New Zealand Patent Application No. 740507, filed Mar. 6, 2018, which is incorporated by reference in its entirety.

FIELD OF THE INVENTION

The present invention relates to motor vehicle engines, and particularly to a bell housing and register plate for use in such engines

BACKGROUND

There are three key components in a car drive train system, the engine, to provide propulsion, the bell housing, to connect the engine to either a manual gearbox or automatic transmission and house either a clutch or torque converter, and a gearbox/transmission, to allow selection of gear ratios either manually or automatically.

These three components of the drive train system must be indexed precisely and perfectly aligned. If all three components are not aligned perfectly, ideally to within 10 microns, then expensive and irreparable damage can be done to the engine, clutch or gearbox. No manufacturer can control the alignment of all three components 100% due to tolerances and alloy shrinkage in the various casting processes used to make each of the components.

This is accentuated in the aftermarket and race car project environments where each of the engine, bell housing and gearbox could be made by three separate manufacturers and thus vary accordingly.

The most common means of attempting to adjust alignment of the engine block and bell housing is the use of adjustable or offset dowels. However, such adjustable dowels are not widely available and the process of installation of adjustable dowels is difficult and time consuming. Dependent on the components to be used in each custom engine set up, the nature and size of such adjustable dowels will also differ requiring a specific set of dowels to be obtained for each engine and bell housing combination.

Other means of coupling the engine and transmission have been devised. US20160305533 provides a kit and adaptor plate which is intended to allow the combination of an engine used with an automatic transmission to be adapted to fit to a manual transmission of a different manufacturer by providing a plate with a variety of selectable holes.

While the offset dowels and the prior art noted above include methods which have been devised in order to provide alignment and combination between components from different manufacturers, such methods suffer from various defects. An improved and more efficient solution to provide convenient and adjustable alignment is desired.

SUMMARY OF THE INVENTION

In a first broad aspect of the invention, there is provided a bell housing with an adjustable register plate for providing adjustable engine crankshaft-transmission alignment; the bell housing comprising a body adapted for attachment to an engine block, the body including a recessed area, wherein the recessed area is adapted to receive an adjustable register plate and includes a plurality of register plate attachment holes, the recessed area further comprising a register bore for accommodating a transmission; the adjustable register plate comprising a register bore for accommodating the transmission, and a plurality of register plate fastener holes for accommodating a plurality of corresponding fasteners, each fastener having a head and a stem, wherein the register plate fastener holes each have a region to accommodate the head of the fastener, which region has a diameter greater than the diameter of said head, and a region to accommodate the stem of the fastener, which region has a diameter greater than the diameter of said stem, and smaller than the diameter of said head; wherein the register plate may be secured to the bell housing by inserting two or more register plate fasteners through two or more of the plurality of register plate fastener holes into the corresponding register plate attachment holes of the bell housing, and wherein the alignment of the register plate relative to the bell housing, and thereby alignment of the transmission with the crankshaft, may be adjusted by loosening the fasteners and moving the register plate laterally, about the register plate fasteners, relative to the bell housing, and then tightening the fasteners to locate the register plate in the desired position.

It will be appreciated that, by providing a register plate having register plate fastener holes, each with a region to accommodate the head of the fastener, which region has a diameter greater than the diameter of said head, and a region to accommodate the stem of the fastener, which region has a diameter greater than the diameter of said stem, and smaller than the diameter of said head, that small adjustment of the register plate laterally in the x-y plane, about the fasteners, can be achieved in order to allow adjustment to obtain the correct alignment between the engine crankshaft and the transmission.

In a second aspect of the invention, there is provided an adjustable register plate for attachment to a bell housing, the register plate comprising a register bore for accommodating the transmission, and a plurality of register plate fastener holes for accommodating a plurality of corresponding fasteners, each fastener having a head and a stem, wherein the register plate fastener holes each have a region to accommodate the head of the fastener, which region has a diameter greater than the diameter of said head, and a region to accommodate the stem of the fastener, which region has a diameter greater than the diameter of said stem, and smaller than the diameter of said head; wherein the register plate is configured to be secured to the bell housing by inserting two or more register plate fasteners through two or more of the plurality of register plate fastener holes into the corresponding register plate attachment holes of the bell housing, and wherein the alignment of the register plate relative to the bell housing, and thereby alignment of the transmission with the crankshaft, may be adjusted by loosening the one or more fasteners and moving the register plate laterally, about the register plate fasteners, relative to the bell housing, and then tightening the fasteners to locate the register plate in the desired position.

In a third aspect of the invention, there is provided a method for aligning an engine crankshaft and transmission, comprising securing a bell housing to an engine block including an engine crankshaft, the bell housing including a recessed area adapted to receive an adjustable register plate having a plurality of register plate fastener holes, and the recessed area of the bell housing including a plurality of corresponding register plate attachment holes adapted to receive corresponding register plate fasteners, each fastener having a head and a stem, wherein the register plate fastener holes each have a region to accommodate the head of the fastener, which region has a diameter greater than the diameter of said head, and a region to accommodate the stem of the fastener, which region has a diameter greater than the diameter of said stem, and smaller than the diameter of said head; providing an adjustable register plate and locating the adjustable register plate in the recessed area of the bell housing by inserting fasteners through the register plate fastener holes in the register plate and into the register plate attachment holes of the bell housing; adjusting the register plate relative to the bell housing to a desired alignment with reference to the engine crankshaft, by moving the register plate laterally about the register plate fasteners, relative to the bell housing; securing the adjustable register plate to the bell housing in the desired alignment using said fasteners; and securing the transmission and engine crankshaft together via the bell housing and associated adjustable register plate.

Preferably, the register plate is annular in shape with a correspondingly shaped recessed area in the bell housing to accommodate the register plate.

Preferably, the adjusting of the register plate is performed by means of lateral adjustment fasteners located at the periphery of the register plate.

DESCRIPTION OF THE DRAWINGS

In further describing a preferred embodiment of the invention, reference is made to the accompanying drawings in which:

FIG. 3a shows a top view of a bell housing and an attached adjustable register plate according to the invention;

FIG. 3b shows a cross-sectional view along the line C-C of the bell housing and adjustable register plate from FIG. 3a according to the invention.

DETAILED DESCRIPTION OF THE INVENTION

Figure 1:
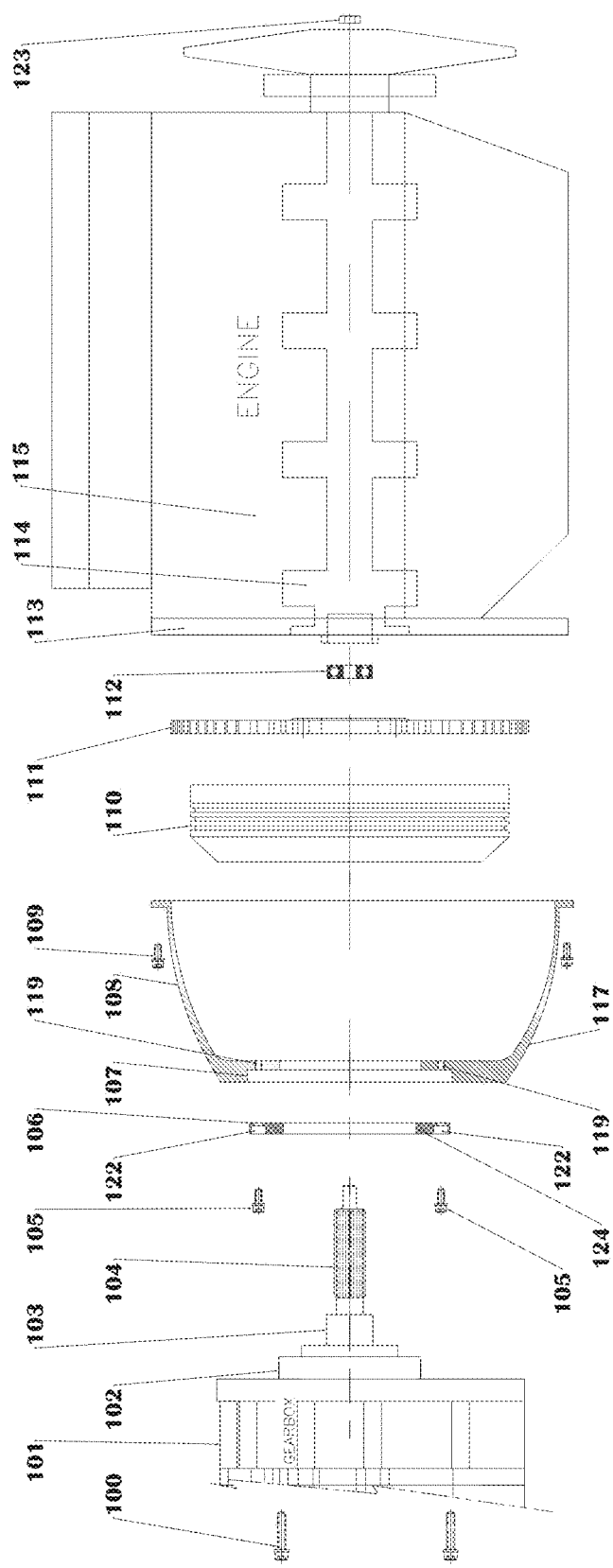
FIG. 1 shows an exploded view of an engine and transmission assembly including a bell housing and adjustable register plate according to the invention.

With reference to FIG. 1, an embodiment of the invention is shown in exploded form in association with typical complementary components engine block 115, and transmission/gear box 101. FIG. 1 also shows the bell housing 108 and adjustable register plate 106, and how these elements are configured relative to the engine block 115 and gear box 101. The bell housing 108 generally includes a body 117 which is adapted to house a clutch 110 or a torque converter, and flywheel 111. Preferably, the bell housing 108 may have a rounded body 117 as shown in FIG. 1

The bell housing 108 is secured to the engine block 115 by a plurality of bell housing to engine block attachment fasteners 109. Such fasteners may be screws, dowels or bolts as necessary. As shown in in FIG. 1, the engine block 115 may also include a bell housing mating flange 113 to assist with securing the bell housing 108 to the engine block 115 in addition to the plurality of engine block attachment fasteners 109.

Figure 2:
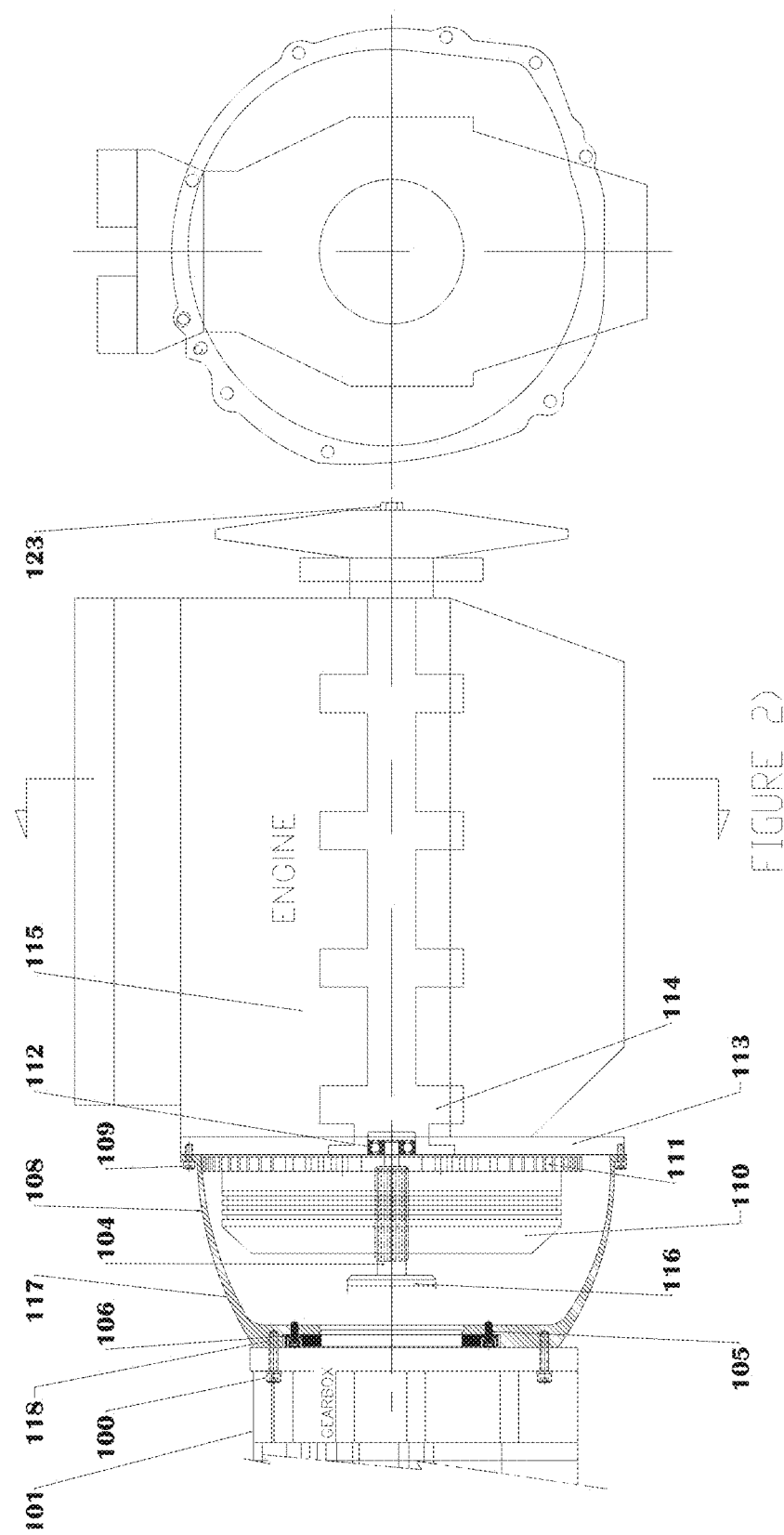
FIG. 2 shows a cross-sectional view of an engine and transmission assembly including a bell housing and adjustable register plate according to the invention.

As shown in FIG. 2, the bell housing 108 must also be attached to the gear box 101. This may be achieved by the use of gear box to bell housing attachment fasteners 100 which insert into gear box fastener holes 118 on bell housing 108 in order to couple the two components.

Suitable gear box to bell housing attachment fasteners 100 and bell housing to engine block attachment fasteners 109 may be screws, dowels or bolts as appropriate to secure the relevant components together. In certain embodiments, a combination of fasteners may be used, for example a combination of bolts and dowels. Fasteners 109 that secure the bell housing 108 to the engine flange 113 are usually the original items supplied with the engine.

As shown in FIG. 1 the bell housing 108 preferably includes a recessed area 107. The recessed area or recess 107 is adapted in terms of size and shape so as to receive an adjustable register plate. As best shown in FIG. 3b, the recess is suitably deep such that when the register plate 106 is inserted into the recess 107, it does not protrude above the surface of the bell housing 108. This allows for precise securing and a flush coupling of the gear box 101 to the bell housing 108.

The bell housing 108 also includes a plurality of register plate attachment holes 119. Preferably, as shown in FIG. 1, these are positioned within recess 107 in order to allow the securing of register plate 106 to the bell housing 108 once suitable alignment has been obtained.

The bell housing 108 further includes a bell housing register bore 121 shown in FIG. 3b which can accommodate the gear box pilot register 102. Bell housing register bore 121 is machined with additional clearance beyond the minimum size to accommodate gear box pilot register 102 so that the alignment can be adjusted using the register plate 106 without the gear box pilot register 102 contacting the bell housing 108.

The bell housing 108 is typically produced from aluminium or steel, but may be produced from any other suitable metal or composite material which is suitably robust.

The register plate 106 is shown in each of FIGS. 1-3b. As shown in FIG. 3a the register plate 106 is preferably annular in shape. However, the register plate 106 may be any shape which corresponds to fit the shape of the recessed area 107 and allows adjustability.

Specifically, the register plate 106 should be smaller in diameter, width or other dimension, so as to allow adjustability and movement within the recessed area of the bell housing 108, about the register plate fasteners 105. For example, as shown in FIG. 3b a small gap 200 can be observed between the outside edge of the adjustable register plate 106 and the bounds of the recessed area 107.

As shown in FIG. 3b, the register plate 106 incorporates a register plate bore 120. This is the aperture at the centre of the register plate 106 which is adapted to accommodate the gear box pilot register 102. The gear box pilot register 102 helps guide the gear box input shaft 104 into place to allow coupling with the engine crankshaft 114 via engine crankshaft pilot bearing 112 as shown in FIG. 2. The register plate bore 120 is provided with a precisely machined diameter dependent on the gear box to be fitted so as to provide a snug fit with the gearbox pilot register 102.

In comparison, and as shown in FIG. 3b, the bell housing register bore 121 is machined to a larger diameter so that the alignment of the engine crankshaft to transmission input coupling can be adjusted by movement of the register plate 106 without causing the transmission and gear box pilot register 102 to contact the edge of the bell housing register bore 121.

The register plate 106 and its register plate bore 120 are machined to accommodate a particular model of gearbox and pilot register thereof. For example, a common configuration which a register plate 106 may be adapted to accommodate would be a Muncie pattern. The bell housing register bore 121 is suitably sized so as to accommodate any gearbox, so that a transmission can be swapped and aligned by substitution of a register plate with a suitably sized register plate bore 120 to accommodate a gearbox of a different manufacturer.

The register plate 106 includes a plurality of register plate fastener holes 122 as best shown in exploded FIG. 1. The register plate fastener holes 122 are preferably configured so as to be recessed into the register plate 106. This allows the desired flush coupling relationship with the transmission to be achieved. The recessed arrangement of the register plate fastener holes 122 provides clearance about the head of the relevant register plate fastener 105, such that the necessary adjustment, and movement of the register plate laterally about the fasteners to enable alignment is permitted.

As best shown in FIG. 3b, the diameter of the register plate fastener holes 122 on the register plate, represented by the lines separated by the letter B and C, are larger than the diameter of the corresponding head and stem of the register plate fasteners 105, represented by lines separated by the letters A and D, respectively. This relationship is shown in the area marked 203 in FIG. 3b and provides an amount of clearance about the register plate fasteners 105 such that the register plate 106 can be adjusted laterally in the x-y plane. For example, a +/− value clearance such as +/−0.25 mm may be provided for.

The register plate should include a minimum of at least two register plate fastener holes 122 in order to allow the register plate 106 to be adequately secured to the bell housing 108. However, as shown in FIG. 3a for example, preferably the register plate may include eight register plate fastener holes 122 (not annotated in FIG. 3a) associated with each of depicted register plate fasteners 105, which secure the register plate 106 to the bell housing 108 by engaging with corresponding register plate attachment holes 119. Alternatively, the register plate 106 and bell housing 108 could include from three to twelve register plate fastener holes 122 and corresponding register plate attachment holes 119, in order to secure the register plate 106 to bell housing 108.

The register plate fastener holes 122 and corresponding register plate attachment holes 119 may be spaced about the register plate 106 in any configuration which permits the desired scope of adjustment. For example, as shown in FIG. 3a, the register plate fasteners 105, and register plate fastener holes 122 (not pictured) and corresponding register plate attachment holes 119 are in four sets of pairs around the perimeter of the register plate. In order to permit the movement of the register plate 106 about the register plate fasteners 105, typically the register plate fastener holes 122 are not threaded and do not engage with the register plate or the register plate fasteners. When suitable alignment is achieved, the register plate 106 may be fixed in place by the register plate fasteners 105 by tightening the fasteners into the register plate attachment holes 119 to a sufficient degree that the head of the fasteners secure the register plate 106 to bell housing 108 by tension when the register plate fasteners 105 are tightened to a suitable extent.

Figure 4A:
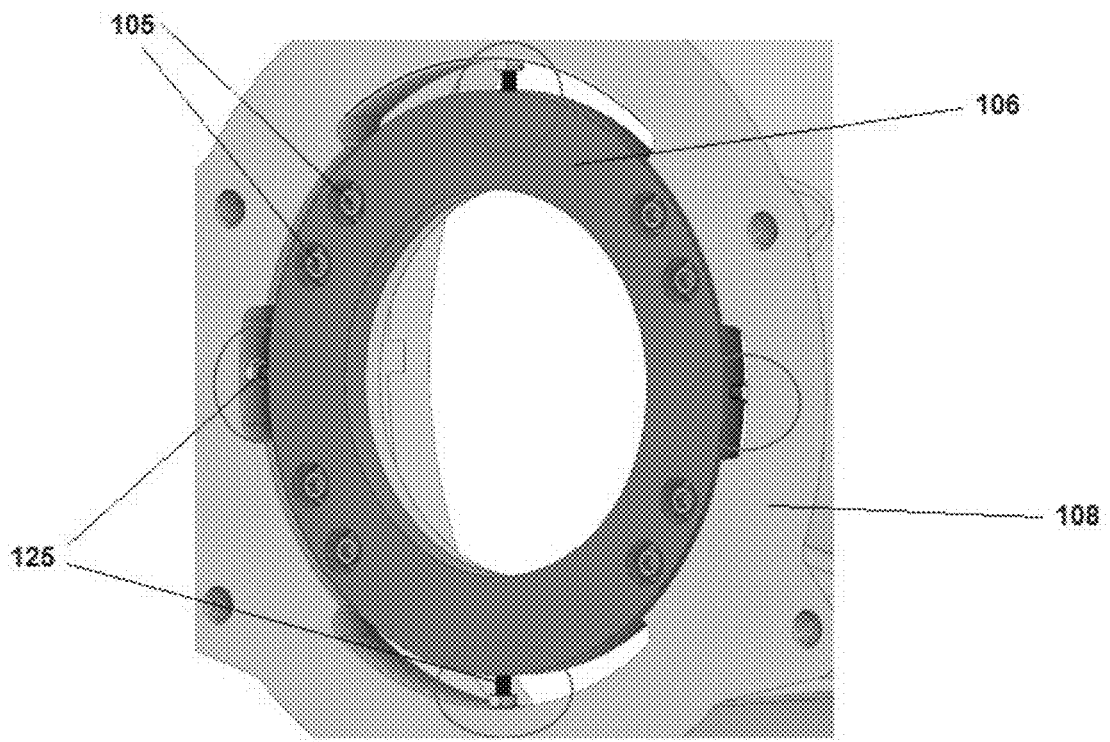
FIG. 4a shows a magnified perspective view of an embodiment of a bell housing and adjustable register plate according to the invention including lateral adjustment fasteners.
Figure 4B:
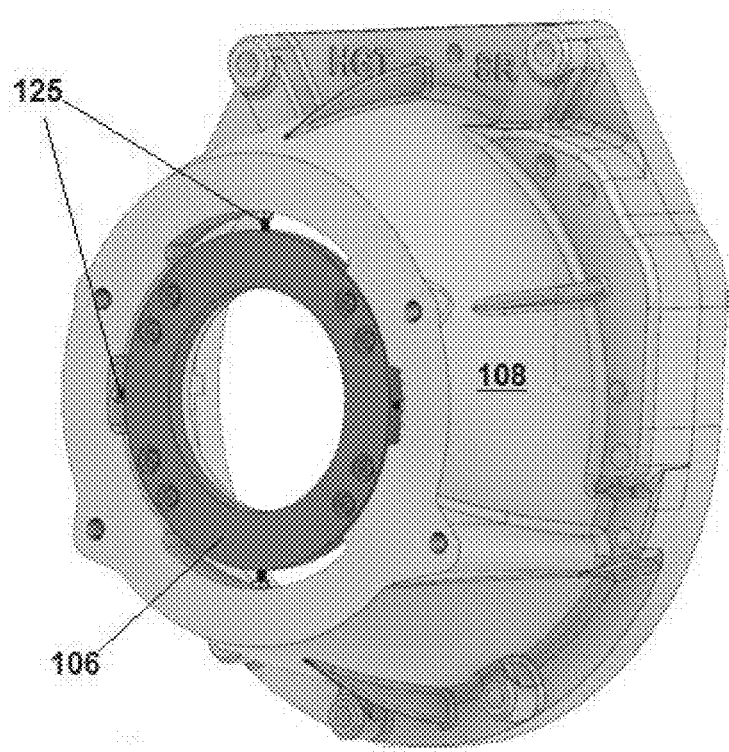
FIG. 4b shows a perspective view of an embodiment of a bell housing and adjustable register plate according to the invention including lateral adjustment fasteners.

FIGS. 4a and 4b show an embodiment of the invention which includes lateral adjustment fasteners 125. The presence of lateral adjustment fasteners, typically provided as four fasteners spaced at equal distances around the periphery of the register plate allows the alignment of register plate 106 to be finely adjusted by tightening or loosening of the respective lateral adjustment fasteners 125 spaced around the periphery of the register plate. While the preferred embodiment shown in FIGS. 4a and 4b shows four lateral adjustment fasteners, any number of lateral adjustment fasteners from one to eight or more lateral adjustment fasteners could be used dependent on end use requirements. Each of the adjustment fasteners typically consists of a threaded arrangement associated with the bell housing and periphery of the register plate, however alternative configurations allowing this fine adjustment would also be available. The presence or lack of lateral adjustment fasteners therefore means that the alignment of the register plate can be adjusted by means of the adjustment fasteners, or manually, dependent on the presence or absence of the lateral adjustment fasteners 125.

Register plate fasteners 105 are shown in each of FIGS. 1-3b and may be of any nature which will appropriately secure the register plate 106 to bell housing 108 by insertion through register plate fastener holes 122 and register plate attachment holes 119, while permitting adjustability when the fasteners are not tightened. In order to provide the necessary fastening, register plate fasteners 105 may be threaded in order that they can be secured to correspondingly threaded register plate attachment holes 119. Preferably, register plate fasteners may be screws, and more preferably socket head cap screws with washers. Alternatively, the fasteners may be for example, bolts with a corresponding nut. Many other types of fastener variants could be used including hexagonal head screws and torx head screws.

In use, having register plate fastener holes 122 with a diameter greater than the register plate fasteners 105, and corresponding register plate attachment holes 119, allows the register plate 106 to move laterally in the x-y plane about the register plate fasteners 105 when the register plate is not secured in place, where the x-y plane is shown in FIG. 3a overlaid over the bell housing. This arrangement allows for slight adjustment of position in the x-y plane of the register plate 106 and therefore precise alignment of the transmission, including the pilot register of the gear box 102 and input shaft 104, and the engine crankshaft 114, prior to tightening of the register plate fasteners 105 to secure the register plate 106 to the bell housing 108 in a suitably precise configuration.

It is also contemplated that, if desired, adjustment of the register plate 106 in the z-plane could also be provided if desired in order to obtain suitable alignment of engine crankshaft and transmission, or to suitably couple engine and transmission components from different manufacturers. Such an embodiment may include adaptation of the depth of the recessed area 107 of the bell housing 108 in order to permit adjustment in the z-plane, or alternatively, varied thickness of the register plate 106.

By providing a bell housing and register plate with adjustable alignment, this provides the ability to assemble an engine and transmission coupling with the necessary degree of precision to minimise friction and damage to components.

This example is of a preferred adjustment procedure for the invention using pre-existing tools and techniques:

With reference to FIG. 1, the engine block 115 includes an engine crankshaft 114 which extends out from the engine block, an engine crankshaft pilot bearing 112 is on the centre line of the crankshaft 114. Prior to final assembly of all components shown in FIG. 1, a suitable measuring device such as Dial Test Indicator (DTI) is attached to the face of the crankshaft with a magnetic base or temporarily bolted in position to the crankshaft 114. This normally takes place without the flywheel 111 yet attached. The bell housing 108 containing register plate 106 together with register plate fasteners 105 is fastened to the engine block using engine block attachment fasteners 109. The register plate 106 will at this stage be in its "as supplied" position within recess 107 with fasteners 105 pre-tightened into threaded holes 119 in the bell housing 108. There may be a nominal amount of pre-adjustment of register plate 106 within recess 107 pre-existing "as supplied" or register plate 106 may be any position with in recess 107 within its adjustable range. The pointer of the DTI tool should now be set to contact the bore face 124 and as referred to in 120 of FIG. 3b. The next step is to rotate the engine crankshaft 114 slowly by hand, this is usually achieved by turning it using a suitable wrench tool attached to nut 123 at the other end of the crankshaft. During the turning movement through 360 degrees of crankshaft 114, the DTI will measure the level of radial alignment error, this error value will be checked and if it is outside of a desired value then the required adjustment can take place. If deemed that adjustment is required, then the required value in thousands of an inch, mm or micron's and the direction required should be noted down or can be marked with a suitable marker onto the register plate 106 or bell housing 108.

To achieve the adjustment required as determined above, the plurality of register plate fasteners 105 can be loosened off to enable x-y movement of register plate 106 within recess 107, the register plate is then free to be manually moved by the correct value and in the direction as noted in the first part of the procedure. Once this movement is performed the fasteners 106 should be tightened into their threaded holes 119 so that the register plate 106 is locked into the desired working position within the recess 107.

Alternatively, if lateral adjustment fasteners, as shown in FIGS. 4a-4b are present, these can be used in order to adjust the position of register plate 106 within recess 107.

At this stage it is normally considered a good idea to re-check the adjustment by carrying out the first part of the procedure using the DTI once more to confirm the adjustment was successful. If the measurement is still not found to be within desired limits, then the process can easily be repeated to obtain the desired result.

Once the adjustment is complete the bell housing 108 and DTI apparatus can be removed from the engine 115 and crankshaft 114.

The basic components of the system shown in FIG. 1 can now be assembled and deemed ready for use. The gear box 101 is associated with the clutch 110 via a clutch release bearing 116, which is fitted to clutch release bearing register 103. The bell housing 108 is attached to the engine block 115 to house the clutch 110, flywheel 111 and gear box input shaft 104, and may be guided into place by the presence of the bell housing mating flange 113. Bell housing 108 can then be secured to the engine block by use of a plurality of bell housing to engine block attachment fasteners 109.

The gear box 101 via input shaft 104 can be coupled to the engine crankshaft 114 where the gear box pilot register 102 is snugly located within the register plate bore 120 and has generous clearance within the bell housing register bore 121.

If misalignment occurs after this time or subsequent to assembly, realignment can be achieved by detaching the gear box from the bell housing by removing bell housing attachment fasteners 100, and loosening the register plate fasteners 105 to allow the register plate 106 to be adjusted within the recess, either manually or using lateral adjustment fasteners 125, if present, to restore or obtain a preferred alignment. The register plate fasteners 105 can then be tightened to secure the corrected alignment and configuration before reattachment of the gear box.

The invention by its nature is intended to be retrofitted to existing engines as needed, but also may be provided in new engines. When retrofitting to an existing engine, the invention allows components from various manufacturers, particularly the engine block/crankshaft and transmission, to be coupled efficiently, avoid damage and optimise performance.

While some preferred aspects of the invention have been described by way of example, it should be appreciated that modifications and/or improvements can occur without departing from the scope of the invention as claimed in this specification.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated feature but not to preclude the presence or addition of further features in various embodiments of the invention.

It is to be understood that, if any prior art publication is referred to herein, such reference does not constitute an admission that the publication forms a part of the common general knowledge in the art, in Australia, New Zealand or any other country.

What I claim is:
1. A bell housing, comprising:
an adjustable register plate for providing adjustable engine crankshaft-transmission alignment;
a body adapted for attachment to an engine block, the body including a recessed area, wherein the recessed area is adapted to receive the adjustable register plate and includes a plurality of register plate attachment holes, the recessed area further comprising a register bore for accommodating a transmission;
wherein the adjustable register plate comprises a register bore for accommodating the transmission, and a plurality of register plate fastener holes for accommodating a plurality of corresponding fasteners, each fastener having a head and a stem, wherein the register plate fastener holes each have a region to accommodate the head of the fastener, which region has a diameter greater than the diameter of said head, and a region to accommodate the stem of the fastener, which region has a diameter greater than the diameter of said stem, and smaller than the diameter of said head;
wherein the register plate is secured to the bell housing by inserting two or more register plate fasteners through two or more of the plurality of register plate fastener holes into the corresponding register plate attachment holes of the bell housing, and
wherein the alignment of the register plate relative to the bell housing, and thereby alignment of the transmission with the crankshaft, is adjusted by loosening the fasteners and moving the register plate laterally, about the register plate fasteners, relative to the bell housing, and then tightening the fasteners to locate the register plate in the desired position.

2. The bell housing according to claim 1, wherein the register plate is annular in shape with a correspondingly shaped recessed area in the bell housing to accommodate the register plate.

3. The bell housing according to claim 1, wherein the adjusting of the register plate is performed by means of lateral adjustment fasteners located at the periphery of the register plate.

4. An adjustable register plate for attachment to a bell housing, the adjustable register plate comprising:
a register bore for accommodating the transmission, and a plurality of register plate fastener holes for accommodating a plurality of corresponding fasteners, each fastener having a head and a stem, wherein the register plate fastener holes each have a recessed region to accommodate the head of the fastener, which recessed region has a diameter greater than the diameter of said head, and a region to accommodate the stem of the fastener, which region has a diameter greater than the diameter of said stem, and smaller than the diameter of said head;
wherein the register plate is configured to be secured to the bell housing by inserting two or more register plate fasteners through two or more of the plurality of register plate fastener holes into the corresponding register plate attachment holes of the bell housing, and
wherein the alignment of the register plate relative to the bell housing, and thereby alignment of the transmission with the crankshaft, is adjusted by loosening the one or more fasteners and moving the register plate laterally, about the register plate fasteners, relative to the bell housing, and then tightening the fasteners to locate the register plate in the desired position.

5. The adjustable register plate according to claim 4, wherein the register plate is annular in shape with a correspondingly shaped recessed area in the bell housing to accommodate the register plate.

6. The adjustable register plate according to claim 4, wherein the adjusting of the register plate is performed by means of lateral adjustment fasteners located at the periphery of the register plate.

7. The adjustable register plate according to claim 4, wherein the diameter of the recessed region of each of the register plate fastener holes being greater than the diameter of the head of the corresponding fastener provides clearance about the head of the corresponding fastener.

8. A method for aligning an engine crankshaft and transmission, the method comprising:
securing a bell housing to an engine block including an engine crankshaft, the bell housing including a recessed area adapted to receive an adjustable register plate having a plurality of register plate fastener holes, and the recessed area of the bell housing including a plurality of corresponding register plate attachment holes adapted to receive corresponding register plate fasteners, each fastener having a head and a stem, wherein the register plate fastener holes each have a region to accommodate the head of the fastener, which region has a diameter greater than the diameter of said head, and a region to accommodate the stem of the fastener, which region has a diameter greater than the diameter of said stem, and smaller than the diameter of said head;
providing an adjustable register plate and locating the adjustable register plate in the recessed area of the bell housing by inserting fasteners through the register plate fastener holes in the register plate and into the register plate attachment holes of the bell housing;
adjusting the register plate relative to the bell housing to a desired alignment with reference to the engine crankshaft, by moving the register plate laterally about the register plate fasteners, relative to the bell housing;
securing the adjustable register plate to the bell housing in the desired alignment using said fasteners; and
securing the transmission and engine crankshaft together via the bell housing and associated adjustable register plate.

9. The method according to claim 8, wherein the adjusting of the register plate is performed by means of lateral adjustment fasteners located at the periphery of the register plate.

* * * * *